United States Patent
Lin et al.

(10) Patent No.: US 7,509,121 B2
(45) Date of Patent: Mar. 24, 2009

(54) METHOD OF UPDATING FIRMWARE USING OBJECT PUSH PROFILE IN THE BLUETOOTH OBJECT EXCHANGE PROTOCOL

(75) Inventors: Zheng-Liang Lin, Hsinchu (TW); Jinn-Ja Chang, Hsinchu (TW)

(73) Assignee: Terax Communication Technologies Inc., Hsinchu (TW)

( * ) Notice: Subject to any disclaimer, the term of this patent is extended or adjusted under 35 U.S.C. 154(b) by 663 days.

(21) Appl. No.: 11/107,748

(22) Filed: Apr. 18, 2005

(65) Prior Publication Data
US 2006/0234632 A1 Oct. 19, 2006

(51) Int. Cl.
*H04M 3/00* (2006.01)
(52) U.S. Cl. ............... 455/418; 455/419; 455/420; 455/41.2; 455/186.1; 463/39; 709/223
(58) Field of Classification Search ........... 455/418, 455/419, 420, 41.1, 41.2; 463/39; 709/223
See application file for complete search history.

(56) References Cited
U.S. PATENT DOCUMENTS

2004/0181517 A1* 9/2004 Jung et al. ............... 707/3
2004/0243580 A1* 12/2004 Markki et al. ............ 707/9
2004/0243665 A1* 12/2004 Markki et al. ........... 709/201
2004/0243682 A1* 12/2004 Markki et al. ........... 709/207
2006/0053145 A1* 3/2006 Salminen et al. ........ 707/102
2006/0178214 A1* 8/2006 Lehikoinen et al. ....... 463/39
2006/0178215 A1* 8/2006 Lehikoinen et al. ....... 463/39
2007/0038735 A1* 2/2007 Tsunoda et al. .......... 709/223
2007/0067303 A1* 3/2007 Linjama et al. ........... 707/10
2007/0080934 A1* 4/2007 Chen et al. .............. 345/156
2007/0239479 A1* 10/2007 Arrasvuori et al. ......... 705/2
2007/0247449 A1* 10/2007 Mack et al. ............. 345/204
2007/0263815 A1* 11/2007 Nurmi ................ 379/201.01

* cited by examiner

*Primary Examiner*—Minh D Dao
(74) *Attorney, Agent, or Firm*—Rosenberg, Klein & Lee

(57) ABSTRACT

A method of updating firmware using the object push profile in the bluetooth object exchange protocol is proposed. This method first makes use of a bluetooth transmitter to connect a bluetooth electronic device whose firmware is to be updated and a host storing a new program code. Next, the bluetooth transmitter checks parameters in an EEPROM of the bluetooth electronic device to determine whether it is necessary to update the firmware. Through the object push profile (OPP) in the object exchange (OBEX) protocol of the bluetooth technology, this new program code is reprogrammed to a flash memory in the bluetooth electronic device. After the end of the reprogramming action, the bluetooth connection between the bluetooth electronic device and the host is cut off to finish firmware update of the bluetooth electronic device.

14 Claims, 4 Drawing Sheets

METHOD OF UPDATING FIRMWARE USING OBJECT PUSH PROFILE IN THE BLUETOOTH OBJECT EXCHANGE PROTOCOL

BACKGROUND OF THE INVENTION

1. Field of the Invention

The present invention relates to a method of updating remote programs using the bluetooth technology and, more particularly, to a method of updating remote programs using the object push profile in the object exchange protocol.

2. Description of Related Art

Along with continual progress of the science and technology, electronic products are upgraded constantly. In order to allow products having the same function to accomplish intercommunications between them, most electronic products need to update their firmware. Bluetooth products such as mobile phones, earphones, Dongles, car handsfrees, and so on similarly have the demand for updating their firmware.

In the prior art, when one wants to update the firmware of an electronic product, it is necessary to send the whole electronic product back to the factory to burn a new program code into the flash memory therein. Because the original program code can't be overwritten when making update, the old and new program codes will simultaneously occupy the memory space, hence much wasting the memory resource. Moreover, for users and the manufacturers the process of sending an electronic product back to the factory to upgrade its firmware increases the cost and takes time. Besides, if the user wants to upgrade the firmware of an electronic product, it is necessary to use application software provided by the manufacturer to reprogram the firmware via a wired transmission device like an RS232, a USB port, or a printer port. Among existent bluetooth products, only the Dongle devices allow the user to wirelessly upgrade the firmware. As shown in FIG. 1, a Dongle is connected to a USB port of a personal computer 10. The firmware of a bluetooth electronic device 12 can be updated through bidirectional USB transmission. Other types of bluetooth products can't make use of USB transmission for update of firmware like the Dongle. For instance, because an earphone is small, it has no spare room for connecting a USB port. Moreover, because the bluetooth function of a car handsfree is directly integrated in the primary circuit board of a car, the update of its firmware is difficult.

Accordingly, the present invention aims to propose a method of updating firmware using the object push profile in the object exchange protocol to effectively solve the above problems in the prior art.

SUMMARY OF THE INVENTION

An object of the present invention is to provide a method of updating remote programs using the bluetooth technology. The method writes a new program code into a flash memory of a remote device using the object push profile in the object exchange protocol to save the memory space.

Another object of the present invention is to provide a method of updating firmware using the object push profile in the object exchange protocol. The method makes use of the bluetooth technology to transmit a new program code. Therefore, it is not necessary to install a USB connector on small devices like earphones.

Yet another object of the present invention is to provide a method of updating firmware using the object push profile in the object exchange protocol. The method makes use of a Dongle at the host for a bluetooth connection. It is not necessary for the host to install update software, hence much relieving the problem of compatibility.

Still yet another object of the present invention is to provide a method of updating firmware using the object push profile in the object exchange protocol. The method makes use of the object push profile to perform flow control to bluetooth wireless transmission.

To achieve the above objects, the present invention provides a method of updating firmware using the object push profile in the object exchange protocol. The method comprises the steps of: using a bluetooth transmitter installed on a host to connect a bluetooth electronic device whose firmware is to be updated, using the host to store a new program code of the firmware of the bluetooth electronic device; checking parameters in an EEPROM of the bluetooth electronic device to determine whether it is necessary to update firmware; in the bluetooth electronic device through the object push profile in the bluetooth object exchange profile if the firmware needs to be updated; reprogramming the new program code into the flash memory again if the update fails; and cutting off the bluetooth connection between the bluetooth electronic device and the host after the reprogramming action is finished.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention provides a method of updating firmware using the object push profile (OPP) in the object exchange (OBEX) protocol. The present invention makes use of the OBEX object push profile in the bluetooth technology to write a new program code in a host into a flash memory of a bluetooth electronic device through a software procedure of the bluetooth electronic device. Moreover, the old program code will is erased to save the memory space of the flash memory as compared to the prior art.

Figure 1:
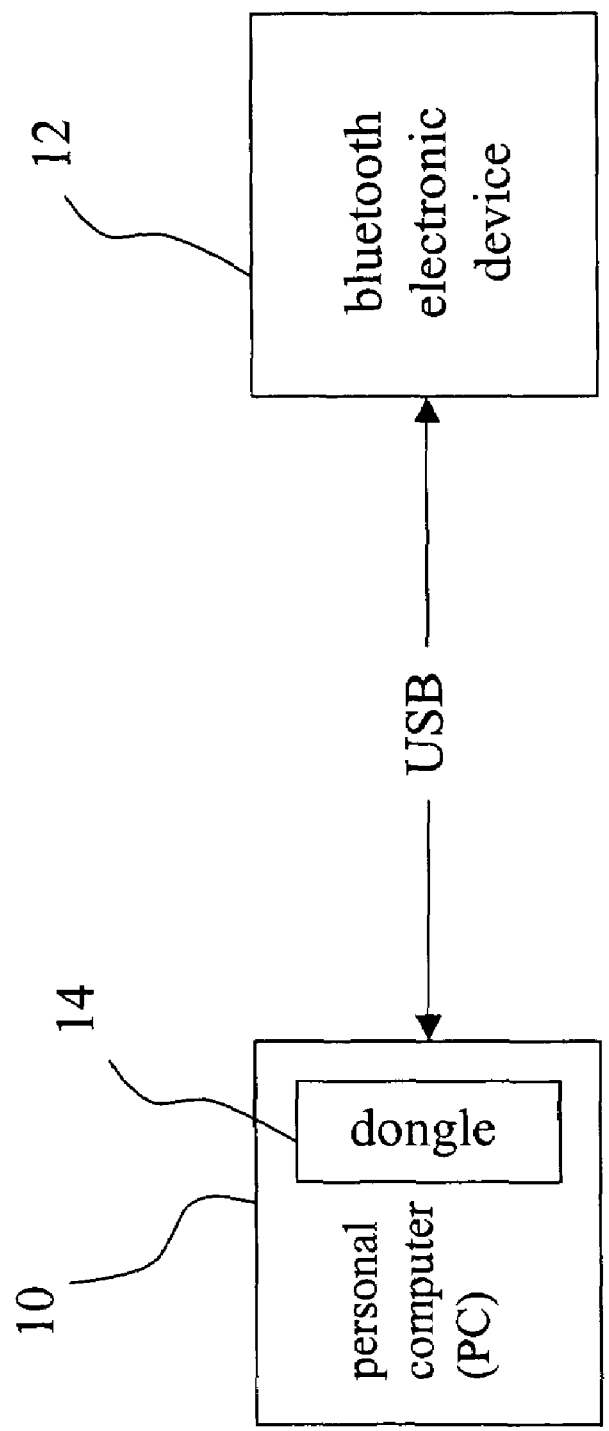
FIG. 1 is a diagram showing the connection of a personal computer and a bluetooth electronic device through a Dongle in the prior art.
Figure 3:
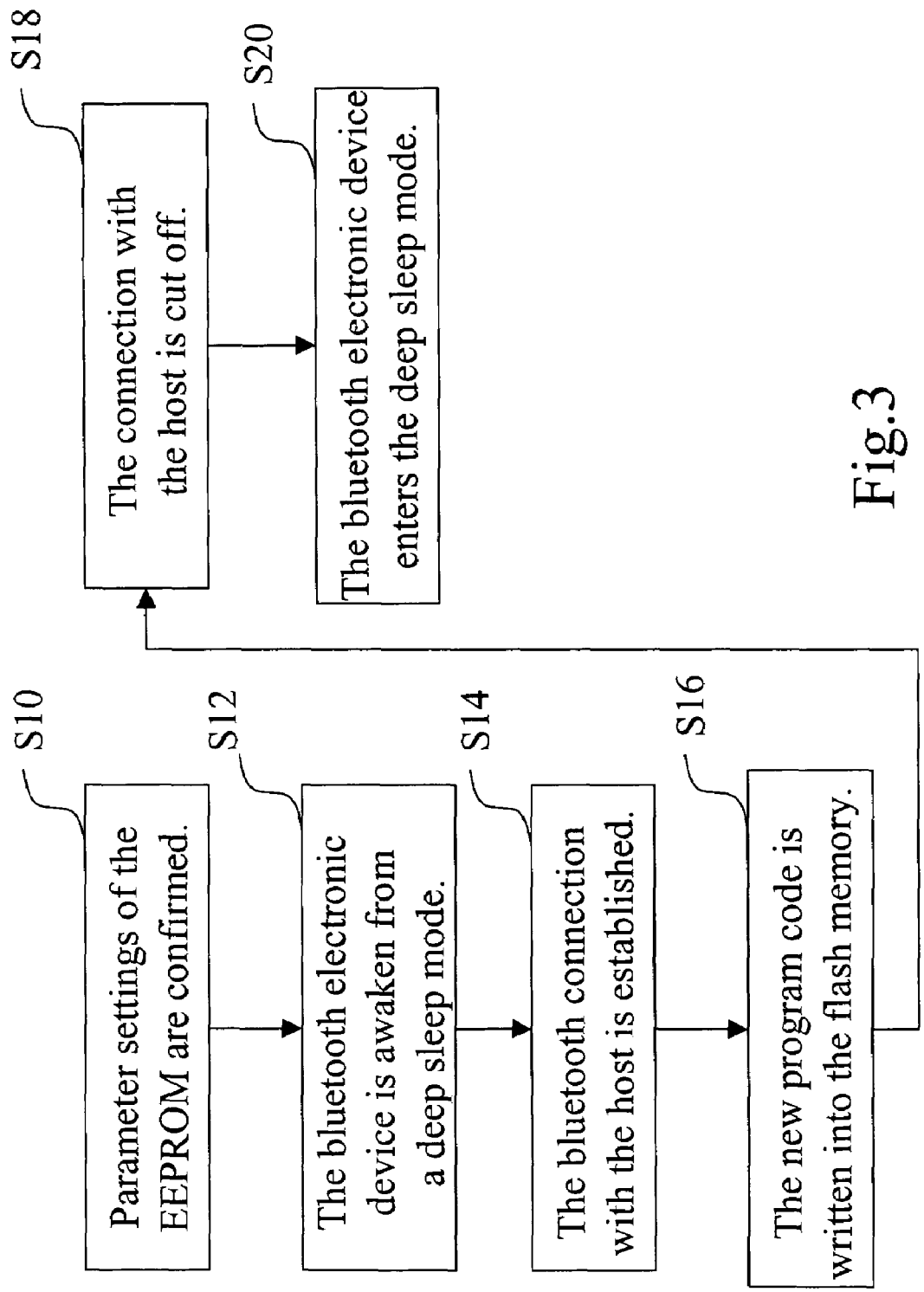
FIG. 3 is a flowchart of the present invention.

As shown in FIG. 1, the firmware of a bluetooth electronic device 18 is to be updated, and the new program code of the firmware is stored in a host 16. The host 16 can be a device having memory, operating, and processing functions like a personal computer, a PDA, or a mobile phone. A Dongle 14 is installed on the host 16 to achieve bluetooth wireless connection with the bluetooth electronic device 18. The bluetooth electronic device 18 comprises an EEPROM 20, a ROM 22, and a flash memory 24. The EEPROM 20 stores user data which won't be changed with update of firmware. In order to update the firmware of the bluetooth electronic device 18, a firmware update application program is executed. Before execution of this application program, it is necessary for the bluetooth electronic device 18 to first enter a deep sleep mode for avoiding data disruption or occurrence of error. This application program is executed after the bluetooth electronic device 18 enters the deep sleep mode. The flowchart is shown in FIG. 3. In Step S10, connection between the bluetooth electronic device 18 and the host 16 is not achieved yet. The application program first needs to confirm the parameter setting in the EEPROM 20. If the parameter setting is up-to-the-minute, meaning the firmware has been updated, update is thus unnecessary; otherwise, it is necessary to update the firmware. If it is necessary to update the firmware, the bluetooth electronic device 18 is awaken from the deep sleep mode (Step S12). Next, the bluetooth electronic device 18 makes connection with the host 16 (Step S14). The connection is accomplished by means of the Dongle 20 originally installed on the host 16.

Figure 4:
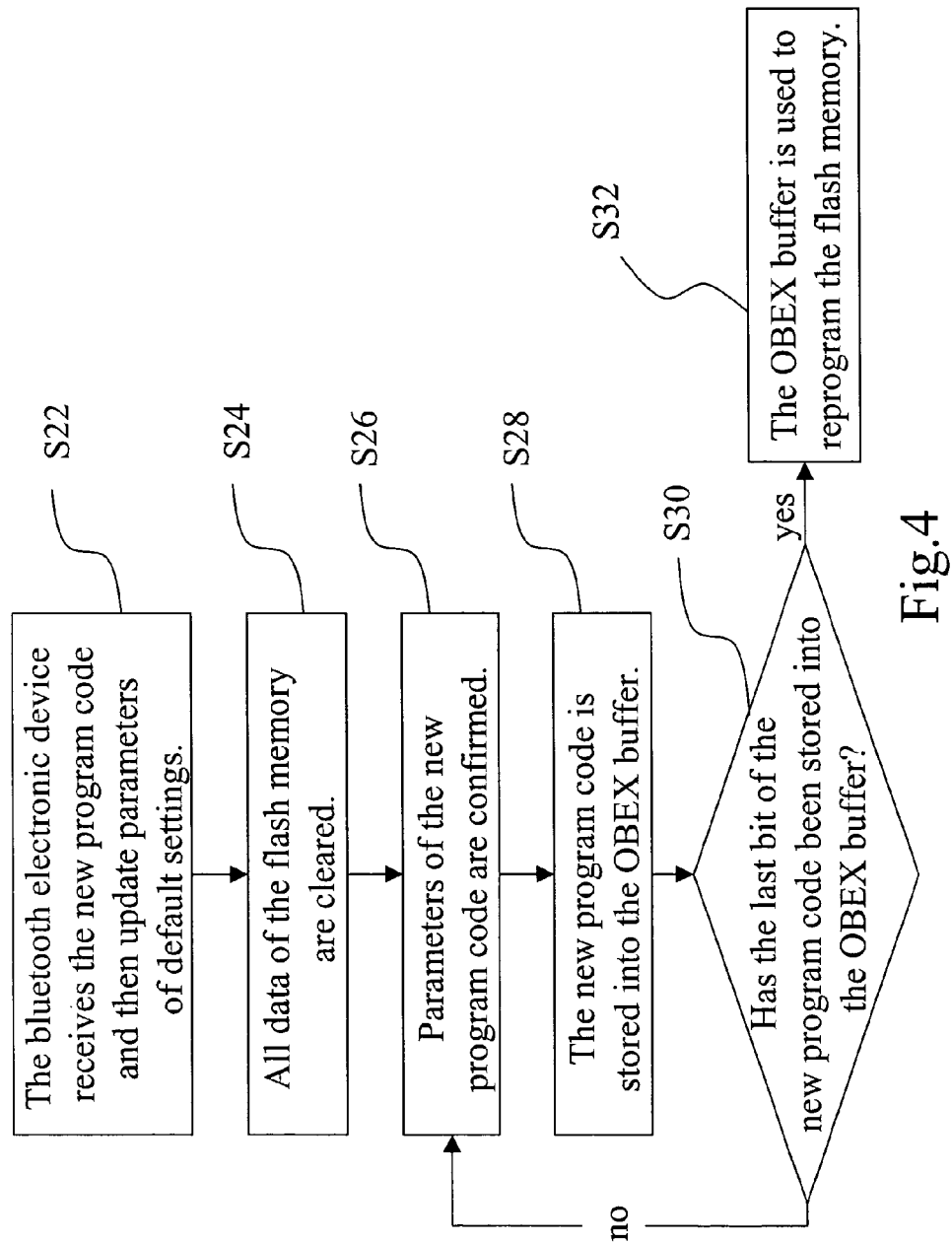
FIG. 4 is a detailed flowchart of Step S16 in FIG. 3.

The new program code in the host 16 is then written into the flash memory 16 of the bluetooth electronic device 18 (Step S16), as shown in FIG. 4. The bluetooth electronic device 18 receives the new program code in the host 16 via the OBEX protocol. If timeout occurs during transmission of the new program code or the received one is another job, error handling is performed and the update action stops. After the new program code is successfully received by the electronic bluetooth device 18, the bluetooth electronic device 18 starts to update default settings, record information like the time and content of this time of update (Step S22). Next, the flash memory 24 is cleared (Step S24). If the clear is successful, the process goes to Step 26. If the clear fails or timeout occurs, error handling is performed to stop the update action. Parameters of the new program code transmitted from the host 16 to the bluetooth electronic device 18 are then confirmed (Step S26). If the parameters are wrong, error handling is performed to stop the update action. If the parameters are correct, the new program code is stored into an OBEX buffer (not shown) (Step S28). Subsequently, whether access of the new program code is finished is determined (Step S30). If the last bit hasn't been built, a "CONTINUE" signal is sent back, and Step S26 to Step S30 are performed once again. This process continues until the last bit of the new program code has been stored into the OBEX buffer. After the last bit of the new program code has been built in the OBEX buffer, the OBEX buffer starts to reprogram the flash memory 24 (Step S32). The new program code is written into the flash memory 24 via the ROM 22. The content of the ROM 22 won't be changed with the update of firmware. After the reprogramming is finished, the firmware update application program sends out a "SUCCESS" response to the bluetooth electronic device 18.

Figure 2:
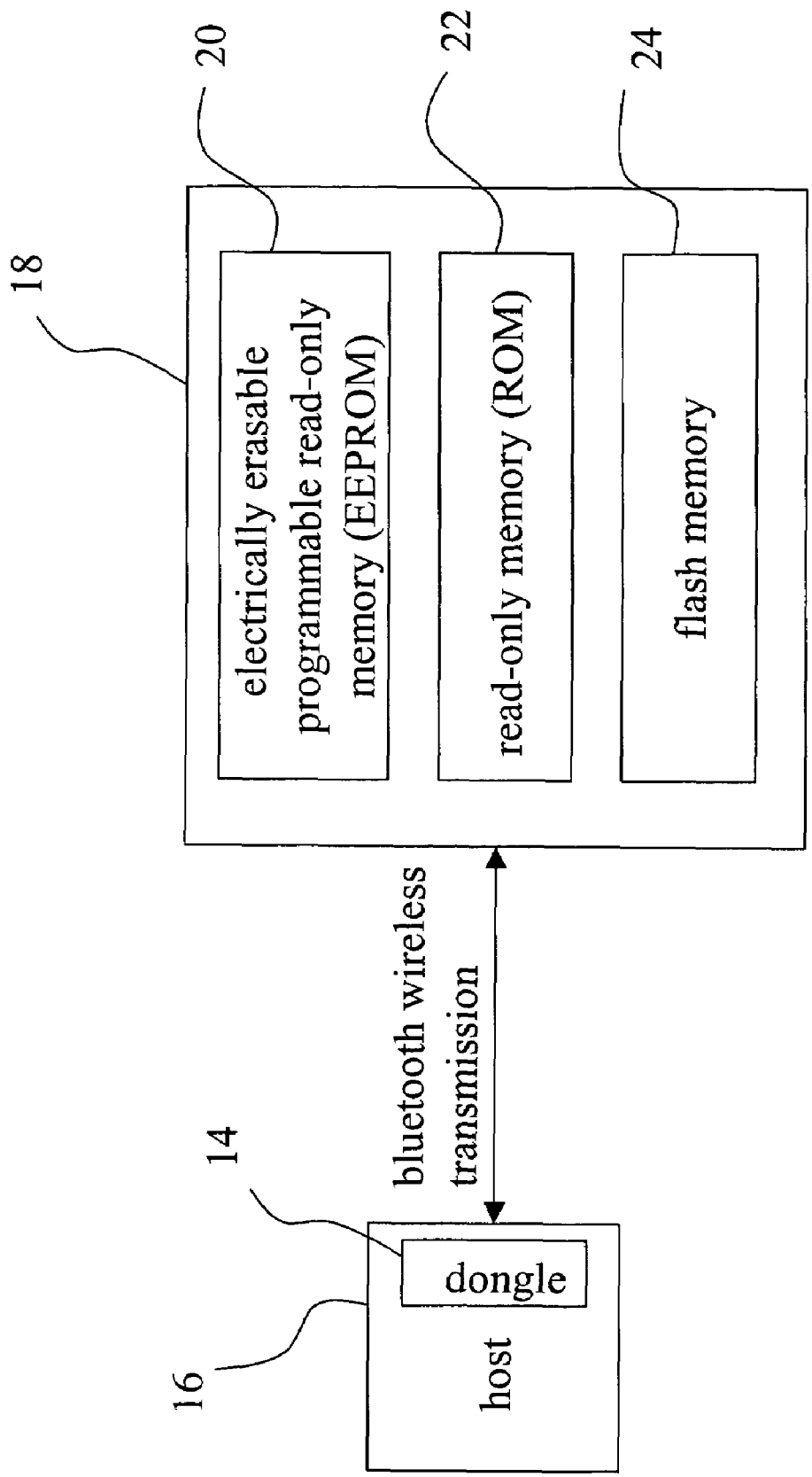
FIG. 2 is a block diagram of the present invention.

Reference is made to FIG. 2. After Step S16, the new program code has been successfully written into the flash memory 18. Next, the bluetooth connection between the bluetooth electronic device 18 and the host 16 is cut off (Step S18), and the bluetooth electronic device 18 enters the deep sleep mode (Step S20). When the bluetooth electronic device 18 leaves the deep sleep mode again, the whole update process of firmware is finished. The bluetooth electronic device 18 will function with the flash memory 24 having the latest firmware afterwards.

In the above update process, when the new program code is being written into the bluetooth electronic device, the bluetooth electronic device still achieves request-response with the host via the bluetooth connection. If an error or timeout occurs in any step of the update process, error handling is performed and the firmware update application program stops the update action until the next update. If this application program is closed at this time, the flash memory will no longer function, and the bluetooth electronic device automatically switches to execution with the ROM. In the prior art, the flash memory functions no matter whether the update of firmware is successful or not. If the host cuts off connection during the bluetooth connection, the bluetooth connection at the bluetooth electronic device will be automatically cut off to avoid crash of system. Before writing in the new program code, if one wants to switch the memory being executed from the flash memory to the ROM, it is necessary to first write into the EEPROM and make the bluetooth electronic device enter the deep sleep mode. The switching action is finished after the bluetooth electronic device leaves the deep sleep mode.

To sum up, the present invention provides a method of updating firmware using the object push profile in the bluetooth object exchange protocol. The method makes use of bluetooth wireless transmission to write a new program code into a flash memory of a bluetooth electronic device. Because the transmission speed of bluetooth is much larger than the write-in speed of flash memory and the object push profile provides appropriate flow control, a RAM with a smaller memory capacity can be used to accomplish write-in of flash memory. Moreover, before the new program code is written into the flash memory, the old program code will be erased, hence saving more memory space as compared to the conventional way of writing the new program code into a ROM. Because the object push profile (OPP) is used primarily for object exchange and all commercially available Dongles have this program attached thereto, extra installation is not required. In other words, a user having a Dongle can perform update of firmware without extra installation, hence resulting in much convenience is use.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A method of updating firmware using the object push profile in the bluetooth object exchange protocol, comprising the steps of:

checking parameters in an EEPROM of a bluetooth electronic device to determine whether it is necessary to update firmware;

using a bluetooth transmitter to connect said bluetooth electronic device whose firmware is to be updated and using a host to store a new program code;

reprogramming said new program code into a flash memory in said bluetooth electronic device through the object push profile in the bluetooth object exchange profile; and cutting off the bluetooth connection between said bluetooth electronic device and said host;

wherein if said new program code is unsuccessfully written into said flash memory, said bluetooth electronic device will wait for the next time of writing;

wherein if writing is closed when said bluetooth electronic device waits for the next time of writing, said flash memory will be disabled and said bluetooth electronic device automatically switches to execution with a ROM.

2. The method of updating firmware using the object push profile in the bluetooth object exchange protocol as claimed in claim 1, wherein said bluetooth transmitter is a Dongle.

3. The method of updating firmware using the object push profile in the bluetooth object exchange protocol as claimed in claim 1, wherein transmission flow of said bluetooth electronic device can be controlled.

4. The method of updating firmware using the object push profile in the bluetooth object exchange protocol as claimed in claim 1, wherein it is necessary for said bluetooth electronic device to first enter a deep sleep mode and then be waken up from said deep sleep mode for performing update.

5. The method of updating firmware using the object push profile in the bluetooth object exchange protocol as claimed in claim 1, wherein said new program code is written into said flash memory via a ROM of said bluetooth electronic device.

6. The method of updating firmware using the object push profile in the bluetooth object exchange protocol as claimed in claim 1, wherein if said new program code is successfully written into said flash memory, said bluetooth electronic device will enter a deep sleep mode and said flash memory will perform said new program code after said bluetooth electronic device is waken up.

7. The method of updating firmware using the object push profile in the bluetooth object exchange protocol as claimed in claim 1, wherein if the memory being executed is to be switched from said flash memory to a ROM before writing-in of said new program code, it is necessary to first write said new program code to said EEPROM and then let said bluetooth electronic device enter a deep sleep mode.

8. The method of updating firmware using the object push profile in the bluetooth object exchange protocol as claimed in claim 1, wherein while said new program code is written into said bluetooth electronic device, request-response is still accomplished with the bluetooth connection between said bluetooth electronic device and said host.

9. The method of updating firmware using the object push profile in the bluetooth object exchange protocol as claimed in claim 1, wherein the bluetooth connection at said bluetooth electronic device will automatically cut off when the connection with said host cuts off.

10. The method of updating firmware using the object push profile in the bluetooth object exchange protocol as claimed in claim 1, wherein the original old program code in said flash memory will be erased when said new program code is written into said flash memory.

11. The method of updating firmware using the object push profile in the bluetooth object exchange protocol as claimed in claim 1, wherein said bluetooth electronic device will update parameters of its own basic setting after said new program code is received by said bluetooth electronic device.

12. The method of updating firmware using the object push profile in the bluetooth object exchange protocol as claimed in claim 1, wherein said bluetooth electronic device will confirm parameters of said new program code and store said new program code into an OBEX buffer if said parameters are correct.

13. The method of updating firmware using the object push profile in the bluetooth object exchange protocol as claimed in claim 12, wherein said OBEX buffer is used to reprogram said flash memory after said new program code is totally stored into said OBEX buffer.

14. A method of updating firmware using the object push profile in the bluetooth object exchange protocol, comprising the steps of:
checking parameters in an EEPROM of a bluetooth electronic device to determine whether it is necessary to update firmware;
using a bluetooth transmiffer to connect said bluetooth electronic device whose firmware is to be updated and using a host to store a new program code;
reprogramming said new program code into a flash memory in said bluetooth electronic device through the object push profile in the bluetooth object exchange profile; and
cutting off the bluetooth connection between said bluetooth electronic device and said host;
wherein if the memory being executed is to be switched from said flash memory to a ROM before writing-in of said new program code, it is necessary to first write said new program code to said EEPROM and then let said bluetooth electronic device enter a deep sleep mode.

\* \* \* \* \*